United States Patent [19]
Lin et al.

[11] Patent Number: 5,467,586

[45] Date of Patent: Nov. 21, 1995

[54] REPLACEABLE CUTTING BLADE FOR A LAWN MOWER BLADE

[76] Inventors: Chun S. Lin; Thomas Lin; Jefferson Lin; Philip Lin, all of 11610 Inwood, Houston, Tex. 77077

[21] Appl. No.: 301,077

[22] Filed: Sep. 6, 1994

[51] Int. Cl.⁶ .................................................. A01D 34/73
[52] U.S. Cl. ...................... 56/17.5; 56/295; 56/DIG. 20
[58] Field of Search ...................... 56/17.5, 295, DIG. 20

[56] References Cited

U.S. PATENT DOCUMENTS

| | | | |
|---|---|---|---|
| 2,932,147 | 4/1960 | Beeston, Jr. | 56/295 |
| 3,103,093 | 9/1963 | House, Jr. | 56/295 |
| 3,415,047 | 12/1968 | Blecke | 56/295 |
| 3,975,891 | 8/1976 | Gunther | 56/295 |
| 4,043,104 | 8/1977 | Jones | 56/295 |
| 4,922,698 | 5/1990 | Taylor | 56/295 |
| 5,036,654 | 8/1991 | Malutich | 56/295 X |

*Primary Examiner*—George A. Suchfield
*Attorney, Agent, or Firm*—Harrison & Egbert

[57] ABSTRACT

An improved lawn mower blade including a cutting blade detachably affixed to a surface of the lawn mower blade and extending outwardly beyond a forward edge of the lawn mower blade, and a cover plate affixed to the cutting blade on the surface of the cutting blade opposite the lawn mower blade. The cover plate is in compressive contact with a surface of the cutting blade. The cutting blade has a thickness less than the thickness of the lawn mower blade. The cutting blade has a beveled edge extending outwardly beyond the forward edge of the lawn mower blade. The cutting blade is secured between the cover plate and the lawn mower blade by a plurality of bolts extending therethrough. A second cutting blade is detachably affixed to a surface of the lawn mower blade at an opposite end of the lawn mower blade and a second cover plate is affixed to a surface of the second cutting blade.

18 Claims, 2 Drawing Sheets

5,467,586

REPLACEABLE CUTTING BLADE FOR A LAWN MOWER BLADE

TECHNICAL FIELD

The present invention relates to lawn mower blades. More particularly, the present invention relates to replaceable elements for use in conjunction with lawn mower blades.

BACKGROUND ART

Rotary lawn mowers, having a blade rotated in a generally horizontal plane, about a central, generally vertical rotatable shaft, are known. The blade of such a lawn mower is a generally flat elongated piece of steel which is rotationally symmetric with the rotatable shaft. The blade has a sharpened edge on the leading edge of the outer portion of the blade. The outer portion trailing edge is generally slightly raised to cause a fan effect so as to lift the grass and to blow the clippings into a bag.

The cutting edge of the mower blade becomes dull very quickly. While the mower blade appears to be cutting for a long period of time, in actuality, the cutting edge may have ceased to be a true cutting edge and may thus sever blades of grass only because the mower blade is rotating very fast. Thus, the blades of grass are broken by the spinning mower blade and are bruised in the process. The grass develops a brown tip because of the bruising, has an unpleasing appearance, and is a damaged plant. Furthermore, since the dull mower blade must break the grass blades, instead of cutting them, the motor which rotates the blade is under an increased load, thus requiring more maintenance and consuming more fuel.

In the past, the sharpening of a mower blade required the removal of the entire blade. Once the blade was removed, a new edge could be grinded or filed onto the blade. The blade would then have to be remounted onto the shaft. This procedure is very difficult and very time consuming.

Various types of replaceable cutters have been proposed to avoid the resharpening and eventual loss of the rotary blade. Such replaceable blades have presented problems of one type or another with regard to the requirement of complex fabrications, strength of the replaceable cutter, weakened resistant to damage by foreign objects, costs, and the like. There has remained a need for a blade with a strong cutter which can be easily replaced at a reasonable cost.

In the past, various U.S. patents have issued relating to replaceable cutting blades for lawn mower blades. For example, U.S. Pat. No. 3,665,692, issued on May 30, 1972, to B. F. Hughes describes a rotary mower holder with expendable blades. A bar is mounted on the shaft of the driving motor of the mower. Each of the ends of the bar define blade receiving channels at opposite ends of the bar. The expendable blades have backs which removably engage the channels. The blades are held in place by frictional engagement and centrifugal force of the blade. Retaining screws can be provided.

U.S. Pat. No. 4,229,933, issued on Oct. 28, 1980, to R. A. Bernard shows a separable mower blade having a slot disposed on the mower blade for reception of a bolt. The bolt is affixed to a stem portion affixed to the drive axis of the motor shaft and to the blade. The blade and the stem are constructed so as to allow easy removal of the blades.

U.S. Pat. No. 4,375,148, issued on March 1, 1983, to Carl E. Beck, teaches a mower blade having cutting elements which are removably attached to a base member. A removable element is held in the base member by means of a wedged slot which cooperates with a wedged part of the shank of the removable cutting element.

U.S. Pat. No. 4,611,460, issued on Sep. 16, 1986, to J. D. Parker provides a support blade with a replaceable cutter for a lawn mower. The support blade has a recess at a top portion adjacent each end which receives a replaceable cutter element. The cutter has a bottom portion which fits snugly in the recess and a laterally extending cutter element which has a front knife edge for cutting and a rear portion which abuts against the blade support in such a fashion that thrust of the cutter is distributed against the back blade support and the back of the recess.

U.S. Pat. No. 4,651,510, issued on Mar. 24, 1987, to W. J. Malutich teaches a lawn mower blade that has cutting edges on removable cartridges. The removable cartridges are affixed directly to the forward edge of the cutting blade. Threaded members are used so as to secure the removable cartridges into slots formed on the forward edge of the cutting blade.

U.S. Pat. No. 4,750,320, issued on Jun. 14, 1988, to T. J. Liebl shows a lawn mower blade having removable cutting tips snappily mounted on a blade base member. The blade can be provided with a new cutting edge by replacing the worn cutting tips with new tips without the need for removing the entire blade from the lawn mower drive spindle.

U.S. Pat. No. b 4,779,407, issued on Oct. 25, 1988, to J. G. Pattee shows a rotary lawn mower bar with non-metallic replaceable cutting and sweeping components. The rotary bar has L-shaped retaining arms, each of which passes through a central channel in a replaceable component.

U.S. Pat. No. 5,018,347, issued on May 28, 1991, to M. A. Feilen, describes replaceable cutting edges for a lawn mower blade. The blade body includes a forwardly extending flange and a rearwardly extending flange. Each flange includes a slot extending along the flange spaced from an end edge surface of the cutting blade by a predetermined distance. A polymeric replacement blade, having a T-shaped projection directed rearwardly of the blade, is receivable within the slot. The blade includes a top and bottom surface aligned with a respective top and bottom surface of the associated blade body.

U.S. Pat. No. 5,036,654, issued on Aug. 6, 1991, to W. J. Malutich describes a replaceable cutting blade for a rotary lawn mower in which the replaceable cutters are held in place by a positive locking arrangement. This locking arrangement includes a safety lock that is manually released by the user. During the operation of the mower, the centrifugal force of the rotating blade locks the cutters in place. Each of the replaceable blades includes an air-deflecting vane.

It is an object of the present invention to provide a replaceable cutting blade that is cost effective, convenient, and easy to use.

It is another object of the present invention to provide a replaceable cutting blade for a lawn mower that is easy to assemble.

It is another object of the present invention to provide a replaceable cutting blade that improves the quality of grass cutting.

It is still a further object of the present invention to provide a replaceable cutting blade that minimizes maintenance requirement, maximizes convenience, and reduces sharpening requirements.

It is still a further object of the present invention to provide a replaceable mower blade that can extend an adjustable distance from the forward edge of the mower blade.

It is still another object of the present invention to provide a replaceable mower blade that is easy to manufacture, easy to use, and relatively inexpensive.

These and other objects and advantages of the present invention will become apparent from a reading of the attached specification and appended claims.

SUMMARY OF THE INVENTION

The present invention is an improved lawn mower blade comprising a cutting blade detachably affixed to a surface of the lawn mower blade and extending outwardly beyond a forward edge of the lawn mower blade, and a cover plate affixed to the cutting blade on a surface of the cutting blade opposite the lawn mower blade. The cover plate is in compressive contact with the surface of the cutting blade.

A bolt is provided which extends through a hole in the lawn mower blade, through an aperture in the cutting blade, and to an orifice in the cover plate. The bolt has threaded means affixed thereto for securing the cutting blade and the cover plate onto the lawn mower blade. The bolt has a head at one end and a nut threadedly affixed to an opposite end. The cover plate, the cutting blade and the lawn mower blade are interposed between the head and the nut of the bolt. A lock washer is provided so as to be in surface-to-surface contact with a surface of the lawn mower blade.

The cutting blade has a longitudinal dimension in parallel relationship to a longitudinal axis of the lawn mower blade. The cutting blade has a slot which extends transverse to this longitudinal dimension. The cutting blade has a thickness less than a thickness of the lawn mower blade. Specifically, the cutting blade has a thickness of between 0.3 and 2.5 mm. The cutting blade has a beveled edge extending outwardly beyond the forward edge of the lawn mower blade. In one embodiment of the present invention, the cutting blade has a pair of beveled edges extending outwardly to a point beyond the forward edge of the lawn mower blade.

In the preferred embodiment of the present invention, the cutting blade has three slots that extend transverse to the longitudinal dimension of the lawn mower blade. These three slots are in parallel relationship to each other. The cover plate has a thickness greater than that of the cutting blade. The cover plate is positioned behind a forward edge of the cutting blade. The cover plate has three orifices positioned in alignment with the three slots of the cutting blade. The lawn mower blade has three holes formed therein in alignment with the orifices of the cover plate. A plurality of bolt members extend through the holes, the slots, and the orifices. Each of the bolt members includes tightening means so as to affix the cover plate, the cutting blade, and the lawn mower blade in compressive surface-to-surface contact. A second cutting blade can be detachably affixed to a surface of the lawn mower blade at an opposite end of the lawn mower blade from the first cutting blade. A second cover plate is affixed to a surface of the second cutting blade. The second cover plate is in compressive contact with the surface of the second cutting blade.

DETAILED DESCRIPTION OF THE INVENTION

Figure 1:
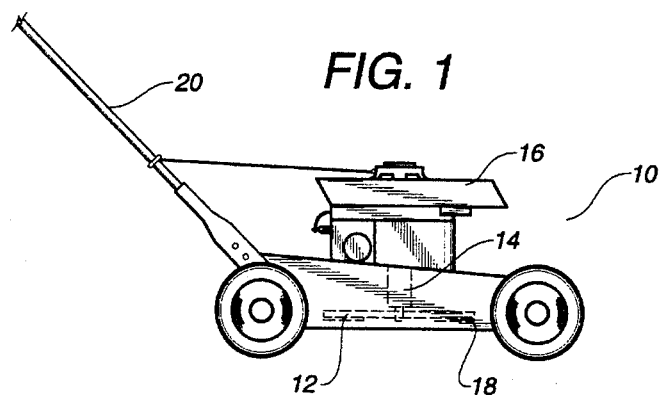
FIG. 1 is a side elevational view of a lawn mower employing the replaceable cutting blade of the present invention.

Referring to FIG. 1, there is shown at 10 a lawn mower that employs the improved lawn mower blade 12 of the present invention. As can be seen, the lawn mower blade 12 is supported in a horizontal plane upon a vertical shaft 14. The vertical shaft 14 is connected to and driven by a prime mover 16. The prime mover 16 is typically an electric or fuel-powered motor. During normal use, the lawn mower blade 12 will rotate in the horizontal plane so as to cut the grass beneath the bottom edge 18 of the mower 10. Control of the mower 10 is provided by the handle 20.

Figure 2:
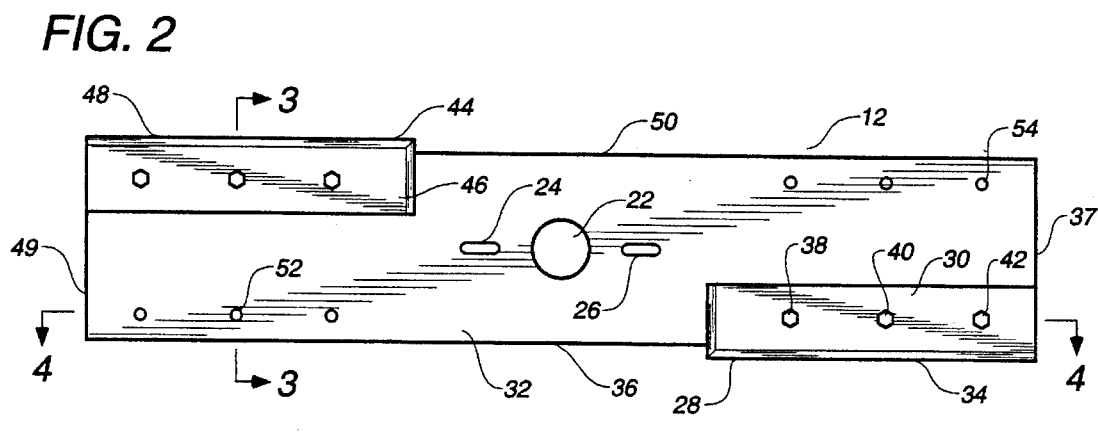
FIG. 2 is a plan view of the improved lawn mower blade of the present invention.

FIG. 2 is a plan view showing the improved lawn mower blade 12 in accordance with the present invention. As can be seen, the lawn mower blade 12 is a bar of a generally rectangular configuration. A central hole 22 is provided in the blade 12 so as to allow the blade 12 to be connected to the shaft 14 of the mower. Keyways 24 and 26 are provided on each side of the central hole 22 so as to provide added security to the attachment of the mower blade 12 to the shaft 14. The central hole 22, along with keyways 24 and 26, are commonly provided on conventional lawn mower blades. The present invention is an improvement to the lawn mower blade 12 by the addition of a cutting blade 28 and a cover plate 30. It can be seen that the cutting blade 28 is attached to a top surface 32 of the blade 12 and has a cutting edge 34 that extends outwardly beyond the forward edge 36 of the lawn mower blade 12. The cover plate 30 is affixed to the top surface of the cutting blade 28 on a surface of the cutting blade 28 opposite the top surface 32 of the lawn mower blade 12. In normal use, the cover plate 30 will be secured to the top surface of the cutting blade 28 so as to be in compressive contact with the top surface of the cutting blade 28. The cutting blade 28 and the cover plate 30 have an end generally flush with the edge 37 of the lawn mower blade 12.

It can be seen that three bolt members 38, 40 and 42 are provided so as to secure the cover plate 30 to the cutting blade 28 and to the lawn mower blade 12.

In accordance with the present invention, a second cutting blade 44 is detachably affixed to the surface 32 of the lawn mower blade 12 at an opposite end of the lawn mower blade 12 from the cutting blade 28. A second cover plate 46 is affixed to a surface of the second cutting blade 44 opposite the surface 32 of the lawn mower blade 12. The second cover plate 46 is also in compressive contact with the cutting blade 44. The second cutting blade 44 has an edge 48 that extends outwardly beyond the edge 50 of the lawn mower blade 12. The cutting blade 44 and the cover plate 46 have an end edge which is flush with the edge 49 of the mower blade 12.

In FIG. 2, it can be seen that the lawn mower blade 12 will rotate in a clockwise fashion so that the forward edges 34 and 48 of the cutting blade 28 and 44, respectively, will "cut" the grass during the rotation of the lawn mower blade 12. Holes 52 and 54 are provided on the mower blade 12 so as to accommodate the present arrangement of cutting blades and cover plates should the mower blade 12 be reversed on the shaft 14.

It is important to realize in the present invention that the cutting blade 28 has a thickness less than the thickness of the mower blade 12 or the cover plate 30. Specifically, the cutting blade 28 will have a thickness of between 0.3 and 2.5 mm. As such, it is fundamental to the concept of the present invention that a "thin" blade 28 is provided. Whenever such a thin blade is provided, the security of the cover plate 30 is necessary. The cover plate 30 will provide the necessary rigidity to the thin blade 28 so as to prevent deformation or tearing of the thin blades 28 during the mowing action. The placement of the cover plate 30 extends substantially over the entire top surface area of the cutting blade 28 so as to further reinforce the strength and rigidity of the blade 28. The cover plate 30 is positioned rearwardly of the forward edge 34 of the cutting blade 28 and is generally aligned with the forward edge 36 of the lawn mower blade 12.

Figure 3:
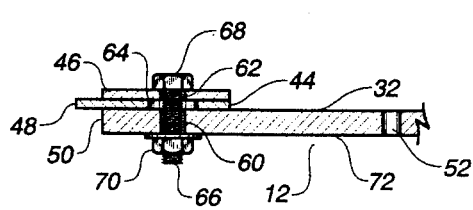
FIG. 3 is a cross-sectional view taken across lines 3—3 of FIG. 2.

FIG. 3 shows the arrangement of the cutting blade 40 with respect to the mower blade 12. As can be seen, the cutting blade 44 has a bottom surface in surface-to-surface contact with the top surface 32 of lawn mower blade 12. The cover plate 46 is in surface-to-surface contact with the top surface of the cutting blade 44. It can be seen that the forward edge 48 of the cutting blade 44 extends outwardly beyond the forward edge 50 of the lawn mower blade 12.

In FIG. 3, it can be seen that the lawn mower blade 12 has a hole 60. The cover plate 46 has an orifice 62. The cutting blade 44 has a slot 64. A bolt 66 extends through the hole 60, the slot 64, and the orifice 62. Bolt 66 has a head 68 at one end and a nut 70 at the opposite end. The nut 70 is threaded engagement with the end of the bolt 66. The tightening of the nut 70 will draw the cover plate 46 downwardly so as to be in compressive contact with the cutting blade 44 and with the lawn mower blade 12. A lock washer can be juxtaposed between the nut 70 and the bottom surface 72 of the lawn mower blade 12 so as to prevent accidental dislodgment of the bolt 66.

Figure 4:
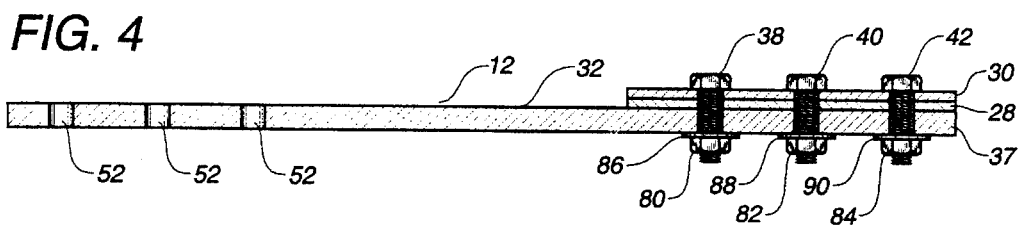
FIG. 4 is a cross-sectional view taken across lines 4—4 of FIG. 2.

FIG. 4 shows the arrangement of the cutting blade 28 and the cover plate 30 on the top surface 32 of the lawn mower blade 12. In particular, it can be seen that three bolts 38, 40 and 42 are provided so as to secure the cover plate 30 onto the top surface of the cutting blade 28 and onto the lawn mower blade 12. Nuts 80, 82, and 84 are tightened onto the threaded end of the bolts 38, 40 and 42, respectively, so as to secure the cover plate 30 and the cutting blade 28 in their proper positions. It can be seen that the shank of the bolts 38, 40, and 42 extend through the hole in the lawn mower blade 12, through the slots in the cutting blade 28, and through the orifices in the cover plate 30. Lock washers 86, 88 and 90 are provided in conjunction with the nuts 80, 82, and 84, respectively, so as to assure the secure attachment of the bolts 38, 40, and 42 to the lawn mower blade 12. It can be seen that the cover plate 30, the cutting blade 28, and the lawn mower blade 12 are interposed between the nuts and the heads of the bolts 38, 40, and 42. The three bolts 38, 40, and 42 are provided so as to resist rotational dislodgment of the cutting blade 28.

Figure 5:
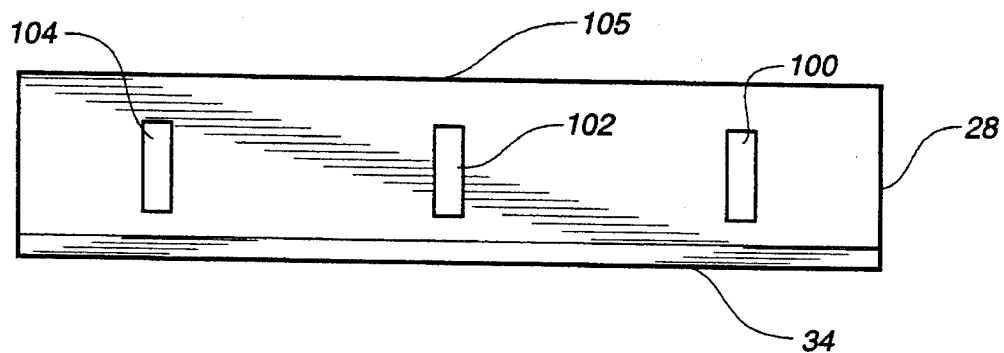
FIG. 5 is a plan view of the cutting blade of the present invention.

FIG. 5 shows an isolated view of the cutting blade 28. In particular, it can be seen that the cutting blade 28 has slots 100, 102, and 104 formed therein. The slots 100, 102, and 104 extend transverse to the longitudinal dimension of the cutting blade 28. As such, the slots 100, 102, and 104 allow the cutting blade 28 to have an adjustable distance between the cutting edge 34 and the forward edge of the lawn mower blade. By loosening the respective bolts, the cutting edge 34 of the cutting blade 28 can be moved forward or pushed backward. It is important to note that the opposite edge 105 can also be sharpened so as to facilitate the reversal and repositioning of blade 12. The cutting blade 28 has, in the preferred embodiment, a length of approximately 3.0 inches and a width of 1.5 inches.

Figure 6:
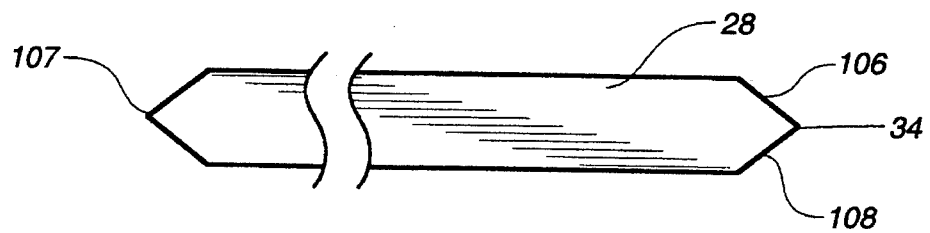
FIG. 6 is a magnified view of the edges of the cutting blade of the present invention, in accordance with one embodiment.
Figure 7:
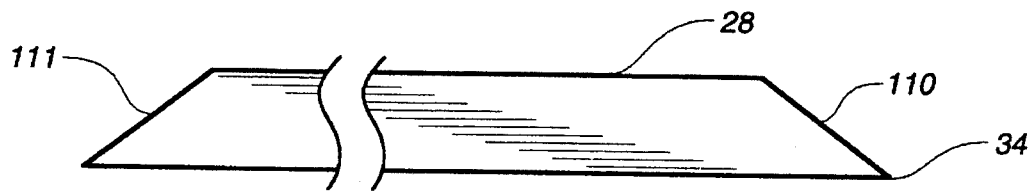
FIG. 7 is a magnified view of the cutting edges of the cutting blade of the present invention, in accordance with an alternative embodiment.

FIG. 6 shows that the cutting blade 28 has a beveled outer edge 34. In FIG. 6, an embodiment of the present invention is employed which has a pair of bevels 106 and 108 which extend to the outer point of the cutting blade 28. The opposite edge 107 of the blade 28 can also be beveled, if necessary, so as to facilitate the reversal and repositioning of the blade 28. In FIG. 7, another embodiment of the present invention has a single bevel 110 extending outwardly to the cutting edge 34 of the cutting blade 28. The opposite end 111 of blade 28 can also be shapened so as to have a bevelled configuration.

Figure 8:
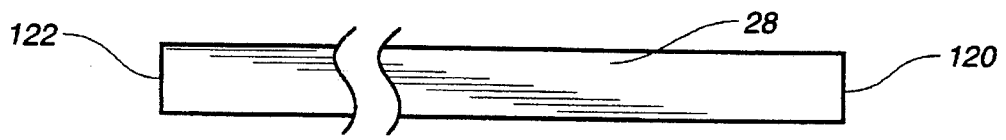
FIG. 8 is a magnified view of the cutting edges of the cutting blade of the present invention, in accordance with another alternative embodiment.

FIG. 8 shows the cutting blade 28 as having flat ends 120 and 122. If the blade 28 is thin enough, then there is no need to bevel the ends so as to achieve the necessary cutting sharpness. The thinness of the cutting blade 28 will serve the desired goals.

In normal use, when it is desired to remove the cutting blades 28 and/or 44 for replacement, then it is only necessary to remove the associated bolts and to lift the cover plate from the top of the cutting blade 28. The cutting blade 28 can then be lifted from the top surface of the lawn mower blade. A new cutting blade can be then installed over the bolts and secured to the lawn mower blade.

It is important to realize that, within the concept of the present invention, the cutting blades can be positioned either adjacent to the top surface of the lawn mower blade or adjacent to a bottom surface of the lawn mower blade. Although, in the preferred embodiment of the present invention, three bolts are employed for securing the cutting blade to the lawn mower blade, a larger or smaller number of bolts can be employed. Various configurations of beveled edges can be provided as the cutting edge of the cutting blade.

The present invention has a number of advantages over prior systems for mowing. The replacement blades are convenient to carry to the job site. If replacement is needed, while at work, then the replacement blade can easily be carried out without the need to haul the entire lawn mower back for sharpening and blade replacement. As such, it is easy to keep the blade to its proper maintenance schedule.

The sharp blade improves the cutting quality of the grass. As such, the problem associated with the brown color of damaged grass is reduced.

The present invention is very economical. Rather than carrying out extensive sharpening and replacement activities, the cutting blade can be easily removed and replaced with another blade. In the meantime, the original dull blade can be sharpened in accordance with a desired schedule. It is also possible that a cutting blade can be so inexpensive that the blade becomes disposable. There is never a need to sharpen or replace the original mower blade 12.

The cutting blade includes slots for providing an adjustable distance from the leading edge of the mower blade. As such, the blade can be adjusted to meet the needs of the mowing activity.

The application of the cutting blades of the present invention can also be made in conjunction with mulching blades.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. An improved lawn mower blade, the improvement comprising:

a cutting blade detachably affixed to a surface of the lawn mower blade and extending outwardly beyond a forward edge of the lawn mower blade, said cutting blade having a longitudinal dimension in parallel relationship to a longitudinal axis of the lawn mower blade, said cutting blade having a slot extending transverse to said longitudinal dimension; and a cover plate affixed to said cutting blade on a surface of said cutting blade opposite the lawn mower blade, said cover plate in compressive contact with said surface of said cutting blade.

2. The lawn mower blade of claim 1, the lawn mower blade having a hole formed therein, said improvement further comprising:

a bolt extending through the hole of the lawn mower blade, said cutting blade having an aperture formed therein, said cover plate having an orifice, said bolt extending through said aperture and said orifice, said bolt having threaded means affixed thereto, said threaded means for securing said cutting blade and said cover plate onto said bolt.

3. The lawn mower blade of claim 2, said bolt having a head at one end, said threaded means comprising:

a nut threadedly affixed to an opposite end of said bolt, said cutting blade and said cover plate and the lawn mower blade being interposed between said head and said nut.

4. The lawn mower blade of claim 3, said improvement further comprising:

a lock washer juxtaposed against said nut and extending around said bolt, said lock washer in surface-to-surface contact with a surface of the lawn mower blade, said lock washer locking a position of said nut on said bolt.

5. The lawn mower blade of claim 1, said cutting blade having a thickness less than a thickness of the lawn mower blade.

6. The lawn mower blade of claim 5, said cutting blade having a thickness of between 0.3 and 2.5 mm.

7. The lawn mower blade of claim 6, said cutting blade having a beveled edge extending outwardly beyond the forward edge of the lawn mower blade.

8. The lawn mower blade of claim 7, said cutting blade having a pair of beveled edges extending outwardly to a point outwardly beyond the forward edge of the lawn mower blade.

9. The lawn mower blade of claim 1, said cutting blade having three slots extending transverse to said longitudinal dimension, said three slots being in parallel relationship to each other.

10. The lawn mower blade of claim 1, said cover plate having a thickness greater than said cutting blade, said cover plate positioned behind a forward edge of said cutting blade.

11. The lawn mower blade of claim 9, said cover plate having three orifices positioned in alignment with said three slots of said cutting blade, the lawn mower blade having three holes formed therein, said three holes aligned with said orifices of said cover plate, the improvement further comprising:

a plurality of bolt members extending through the holes, through said slots, and through said orifices, each of said bolt members having tightening means thereon so as to affix said cover plate, said cutting blade, and the lawn mower blade in compressive contact.

12. The lawn mower blade of claim 1, the improvement further comprising:

a second cutting blade detachably affixed to a surface of the lawn mower blade at an opposite end of the lawn mower blade; and a second cover plate affixed to a surface of said second cutting blade opposite the lawn mower blade, said second cover plate in compressive contact with said surface of said second cutting blade.

13. A mower apparatus comprising:

a mower blade having a forward edge;

a prime mover means connected to said mower blade for rotating said mower blade in a desired direction;

a cutting blade detachably affixed to a surface of the mower blade and extending outwardly beyond a forward edge of the mower blade; and a cover plate affixed to said cutting blade on a surface of said cutting blade opposite the mower blade, said cover plate being in compressive contact with said surface of said cutting blade, said cutting blade having a longitudinal dimension in parallel relationship to a longitudinal axis of said mower blade, said cutting blade having three slots extending transverse to said longitudinal dimension, said three slots being in parallel relationship to each other, said cover plate having three orifices positioned in alignment with said three slots of said cutting blade, said mower blade having three holes formed therein, said three holes aligned with said three orifices of said cover plate, a plurality of bolt members extend through said holes, said slots, and said orifices, each of said bolt members having tightening means so as to affix said cover plate, said cutting blade, and said mower blade in compressive contact.

14. The apparatus of claim 13, said cutting blade having a thickness less than a thickness of the mower blade, said cutting blade having a thickness of between 0.3 and 2.5 mm.

15. The apparatus of claim 13, said cutting blade having a beveled edge extending outwardly beyond said forward edge of said mower blade.

16. The apparatus of claim 13, said cover plate having a thickness greater than said cutting blade, said cover plate positioned behind a forward edge of said cutting blade.

17. The apparatus of claim 13, further comprising:

a bolt extending through a hole in said mower blade, said cutting blade having an aperture formed therein, said cover plate having an orifice formed therein, said bolt extending through said aperture and said orifice, said bolt having threaded means affixed thereto, said threaded means for securing said cutting blade and said cover plate onto said bolt; and a nut threadedly affixed to an end of said bolt, said bolt having a head at an end opposite said nut, said cover plate, said cutting blade, and said mower blade being interposed between said head and said nut.

18. The apparatus of claim 13, further comprising:

a second cutting blade detachably affixed to a surface of said mower blade at an opposite end of said mower blade; and a second cover plate affixed to a surface of said second cutting blade opposite the mower blade, said second cover plate in compressive contact with said surface of said second cutting blade.

\* \* \* \* \*